United States Patent
Yasuda et al.

(10) Patent No.: US 7,336,929 B2
(45) Date of Patent: Feb. 26, 2008

(54) SHORT RANGE WIRELESS COMMUNICATION SYSTEM, PORTABLE TERMINAL APPARATUS, AND WIRELESS COMMUNICATION APPARATUS

(75) Inventors: Mitsuyoshi Yasuda, Tokyo (JP); Katsutoshi Itoh, Tokyo (JP); Makoto Natori, Saitama (JP); Minoru Yokoshi, Tokyo (JP); Osamu Yoshimura, Kanagawa (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 391 days.

(21) Appl. No.: 11/174,164

(22) Filed: Jul. 1, 2005

(65) Prior Publication Data

US 2006/0003700 A1 Jan. 5, 2006

(30) Foreign Application Priority Data

Jul. 5, 2004 (JP) ............................ P2004-198175

(51) Int. Cl.
*H04B 7/00* (2006.01)
(52) U.S. Cl. .................. 455/41.2; 455/522; 455/574; 455/63.1; 455/343.2; 455/436; 370/338; 370/280; 375/222
(58) Field of Classification Search ............... 455/41.2, 455/522, 574, 343.1, 63.1; 340/825.69; 375/222
See application file for complete search history.

(56) References Cited

U.S. PATENT DOCUMENTS 6,188,718 B1 * 2/2001 Gitlin et al. ................ 375/148

6,681,115 B1 * 1/2004 McKenna et al. .......... 455/517
7,107,010 B2 * 9/2006 Heinonen et al. .......... 455/41.2

(Continued)

FOREIGN PATENT DOCUMENTS

EP 1 164 555 12/2001

(Continued)

OTHER PUBLICATIONS

Promoter Members of Bluetooth Sig, Inc.: "Specification of the Bluetooth System-Version 1.1-vol. 1" Feb. 22, 2001, XP002360028.

*Primary Examiner*—Marceau Milord
(74) *Attorney, Agent, or Firm*—Frommer Lawrence & Haug LLP; William S. Frommer; Thomas F. Presson

(57) ABSTRACT

A portable terminal monitors a signal level of a short-range wireless signal from a wireless communication apparatus. If the signal level drops so low that a state of connection for short-range wireless communications cannot be maintained between the two apparatuses, use of predetermined functions of the portable terminal is limited. A short-range wireless communication facility of the portable terminal and the wireless communication apparatus move into a particular operation mode if communications do not occur therebetween at least for a predetermined time period. In monitoring the signal level of the wireless signal from the wireless communication apparatus in the particular operation mode, the portable terminal reduces a response speed at which to detect a signal level change. This causes the wireless communication apparatus to delay issuing a request for an increase in transmission power, thereby reducing unevenness of the working distance at which to alert a user to the unusual distance traveled between the two apparatuses or beyond which to limit the use of some functions of the portable terminal.

13 Claims, 13 Drawing Sheets

U.S. PATENT DOCUMENTS

| | | | |
|---|---|---|---|
| 7,184,777 B2 * | 2/2007 | Diener et al. | 455/456.1 |
| 7,206,602 B1 * | 4/2007 | Conway | 455/556.1 |
| 2002/0028655 A1 * | 3/2002 | Rosener et al. | 455/16 |
| 2004/0209639 A1 | 10/2004 | Kamperschroer et al. | |

FOREIGN PATENT DOCUMENTS

| | | |
|---|---|---|
| EP | 1 251 472 | 10/2002 |
| GB | 2 318 671 | 4/1998 |
| JP | 2001 352579 | 12/2001 |
| JP | 2001 358827 | 12/2001 |
| WO | WO 03 028312 | 4/2003 |

* cited by examiner

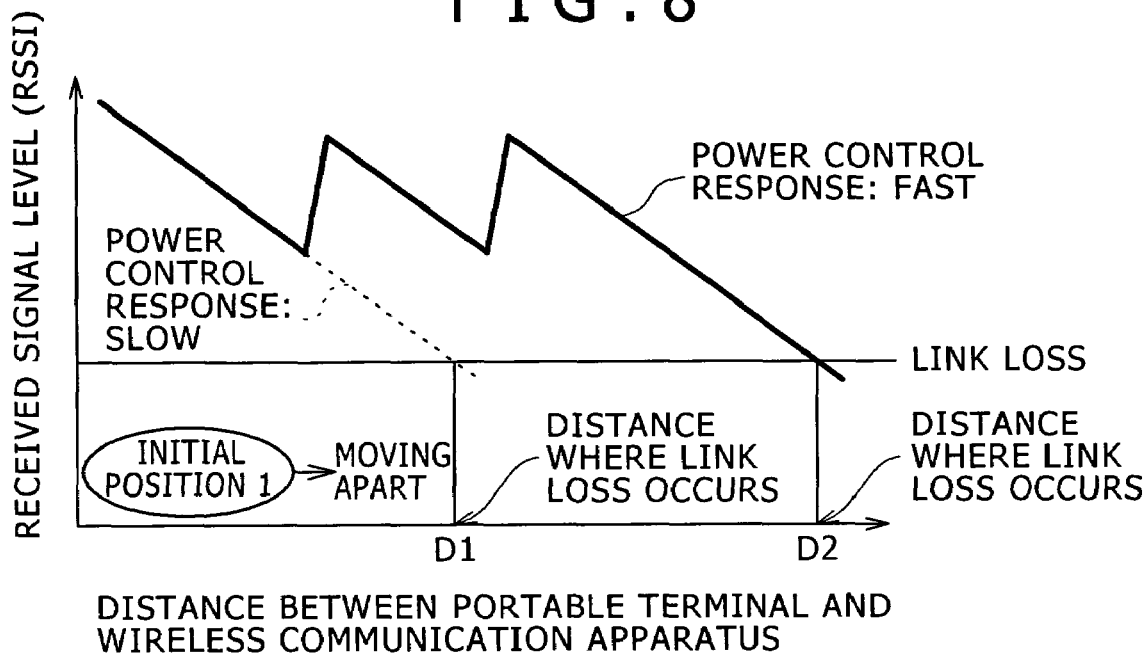
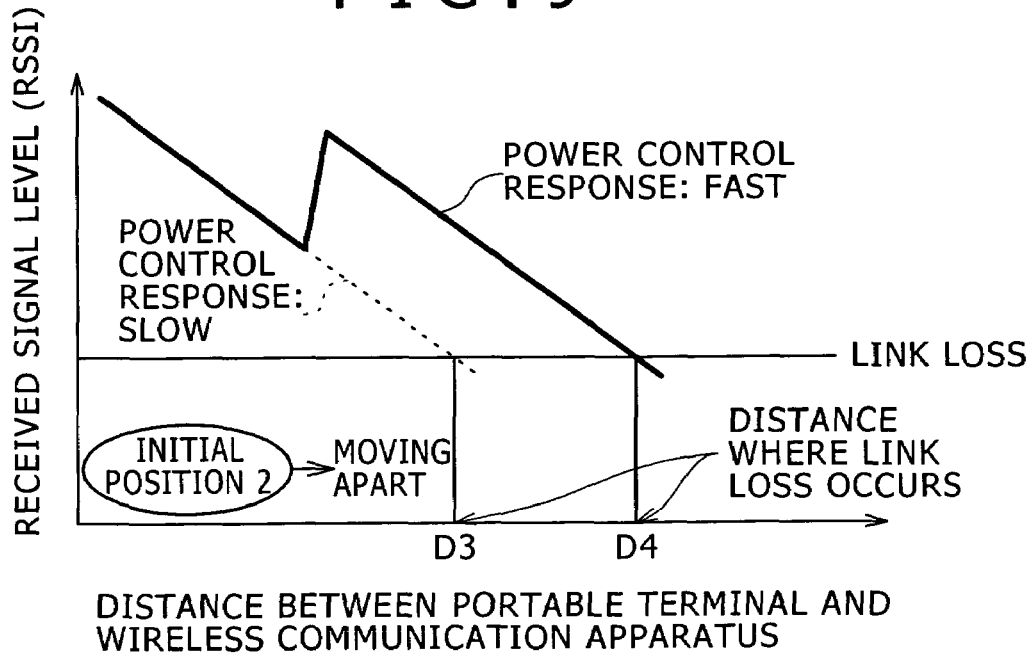

SHORT RANGE WIRELESS COMMUNICATION SYSTEM, PORTABLE TERMINAL APPARATUS, AND WIRELESS COMMUNICATION APPARATUS

CROSS REFERENCES TO RELATED APPLICATION

The present invention contains subject matter related to Japanese Patent Application JP 2004-198175 filed with the Japanese Patent Office on Jul. 5, 2004, the entire contents of which being incorporated herein by reference.

BACKGROUND OF THE INVENTION

The present invention relates to a short-range wireless communication system for conducting wireless communications over relatively short distances, as well as to a portable terminal apparatus and a wireless communication apparatus constituting that system.

Today, portable terminal apparatus (or simply called the terminal) typified by mobile phones are gaining higher functionality and greater versatility than ever before. Along with this trend has come the growing risk of getting the terminal misplaced or stolen, with the result that personal information or electronic purses kept therein could be pilfered or abused.

One proposed solution to the problems above involves having authentication data transmitted from a suitable wireless card or authentication card to the portable terminal so that the terminal is rendered usable only when authenticated by the transmitted data, whereby the abuse of the terminal by anyone other than its legitimate user can be prevented (as disclosed in Japanese Patent Laid-Open Nos. 2001-352579 and 2001-358827).

Another proposed solution to the above problems involves having either a transmitter or a receiver attached to a portable object while the other device is worn by the person carrying that object. When the intensity of radio waves received by the receiver from the transmitted drops below a threshold, an alarm is activated (as disclosed in Japanese Patent Laid-Open No. Hei 8-214933).

Recent years have seen the emergence of portable terminals with short-range wireless communication capabilities such as Bluetooth (registered trademark) for conducting wireless communications over relatively short distances. These terminals are used illustratively in wireless communication with a headset that allows the user to place a call in hands-free fashion, or are arranged to execute data communications with personal computers (PC).

It is conceivable to devise an alarm system getting the user to wear a portable wireless communication apparatus for wirelessly communicating with the short-range wireless communication facility of the terminal apparatus. With this system, an abnormal drop of a signal reception level (e.g., disconnection) during the communication monitored between the user-worn device and the terminal triggers an alarm that will alert the user to the imminent misplacement or theft of the portable terminal.

How to activate such an alarm system poses a problem: the power of transmission is typically adjusted in keeping with the level of signal reception which varies in a changing communication environment between the two devices communicating at close range. As the transmission power is gradually raised to compensate for the drop in the reception level over growing distances between the two device, a breakdown of communication can take place only after a considerable distance has been traveled (e.g., 100 meters at worst). If an alarm is activated at that point to alert the user to the portable terminal being misplaced, going back to recover it over such a long distance can take the user time and trouble that is not negligible. In case of a theft, the alarm activated with such a long distance already traveled makes retrieving the stolen object all but impossible.

Another problem with the above system is that the distance between the two devices (called the working distance) at which the alarm is triggered due to the breakdown of communication can be considerably uneven. That is because the radio waves with frequencies for short-range wireless communications (e.g., on the 2.4 GHz band) are easily affected by the presence of human bodies. The alarm can be triggered at distances of 5 meters or 50 meters. This can give rise to further complications in implementing the system.

The present invention has been made in view of the above circumstances and provides a portable terminal apparatus, a wireless communication apparatus, and a short-range wireless communication system for reducing unevenness of the working distance at which to alert a user to an unusual distance incurred between the portable terminal apparatus and the wireless communication apparatus, or beyond which to limit the use of some functions of the portable terminal apparatus.

SUMMARY OF THE INVENTION

According to one embodiment of the present invention, there is provided a short-range wireless communication system including a portable terminal apparatus having a short-range wireless communication facility, and a wireless communication apparatus capable of wirelessly communicating with the portable terminal apparatus at close range, one of the two apparatuses monitoring a signal level of a wireless signal transmitted by the other apparatus so that if the signal level drops below a predetermined threshold, that one apparatus requesting the other apparatus to increase transmission power. The portable terminal apparatus limits use of predetermined functions thereof if the signal level of the wireless signal from the wireless communication apparatus at close range drops so low that a state of short-range wireless connection with the wireless communication apparatus cannot be maintained. The short-range wireless communication facility of the portable terminal apparatus and the wireless communication apparatus move into a particular operation mode if short-range wireless communications do not take place therebetween at least for a predetermined time period. When the signal level of the wireless signal from the other apparatus is monitored by that one apparatus in the particular operation mode, a response speed at which to detect a level change in the wireless signal is reduced.

Reducing the response speed serves intentionally to make power control difficult to follow the change in the distance between the two apparatuses starting from their initial positions. When the level of the received signal drops over an increasing distance being traveled, the issuance of a command to raise power is thus delayed. That means power control does not immediately compensate for the change in the distance if the portable terminal apparatus and the wireless communication apparatus move apart in a relatively short time. As a result, the level of the received signal keeps dropping until a link loss takes place, i.e., a state is reached in which the connection for communication cannot be maintained between the two apparatuses.

In the initial steady state in which the portable terminal apparatus or wireless communication apparatus is placed in the user's bag or pocket or in which the two apparatuses are in sight of each other in a good communication environment, the power of transmission is adjusted to a level just high enough to ensure stable communications. That means the level of the received signal is substantially the same regardless of the environment. When an increase in the transmission power is curbed over the distance being traveled from the initial state, the level of the received signal drops in a substantially constant manner regardless of the environment. A breakdown of wireless connection (called a link loss) then results from deterioration of the quality of communications at about the same distance without regard to the environment. This reduces unevenness of the working distance between the two apparatuses.

According to another embodiment of the present invention, there is provided a portable terminal apparatus having predetermined functions, including: a short-range wireless communicating means for wirelessly communicating with a wireless communication apparatus at close range; a monitoring means for monitoring a signal level of a wireless signal generated by the wireless communication apparatus; a requesting means for causing the short-range wireless communicating means to output a request asking the wireless communication apparatus to increase transmission power when the signal level of the wireless signal drops below a predetermined threshold; an operation mode controlling means for moving into a particular operation mode when the short-range wireless communications do not take place at least for a predetermined time period; a function limiting means for limiting use of the predetermined functions when the signal level of the wireless signal from the wireless communication apparatus drops so low that a state of connection with the wireless communication apparatus cannot be maintained; and a response speed controlling means for reducing a response speed at which to detect a level change in the wireless signal output from the wireless communication apparatus when the particular operation mode is in effect. The requesting means determines whether or not to make the request for the increase in the transmission power based on the detected output having triggered the reduction of the response speed.

The requesting means requests the wireless communication apparatus to increase the transmission power when the level of the received signal from the wireless communication apparatus drops below a threshold. At this point, the response speed controlling means reduces the response speed at which to detect a level change in the received signal. For that reason, when the wireless communication apparatus moves relatively away from the portable terminal apparatus, the level of the received signal drops so low that the state of connection cannot be maintained before a request to increase the transmission power is issued. As a result, the user is alerted to the disconnection at a relatively early point in time.

Preferably, the inventive portable terminal apparatus may further include a threshold changing means for changing the predetermined threshold with which to compare the signal level in order to output the request asking for the increase in the transmission power. Changing the threshold to reflect the user's instructions makes it possible to vary the working distance at which the level of the received signal drops so low that the state of connection cannot be maintained.

According to a further embodiment of the present invention, there is provided a wireless communication apparatus for conducting short-range wireless communications with short-range wireless communication units located externally, the wireless communication apparatus including: a connecting means for establishing a state of connection for conducting short-range wireless communications with a particular external short-range wireless communication unit; a transmitting means for transmitting a wireless signal to the particular external short-range wireless communication unit; a power adjusting means for adjusting transmission power for sending the wireless signal to the particular external short-range wireless communication unit in accordance with a request from the particular external short-range wireless communication unit; and an alarm generating means which, in case of a disconnection from the particular external short-range wireless communication unit, alerts a user to the disconnection.

The user is supposed to possess the wireless communication apparatus above in combination with a compatible portable terminal apparatus. In case of the portable terminal apparatus getting misplaced or otherwise going missing, the alarm generating means of the wireless communication apparatus alerts the user to the imminent misplacement of the terminal.

Preferably, the inventive wireless communication apparatus may further include a reduced power mode controlling means for moving into a particular operation mode if the short-range wireless communications do not take place at least for a predetermined time period. The power adjusting means, after moving into the particular operation mode, may reject the request to increase the transmission power. Instead of delaying the issue of the request to increase the transmission power, this structure causes the receiving side to ignore the request. This makes it possible to suppress unevenness of the working distance at which the state of connection cannot be maintained, regardless of the environment of short-range wireless communications in effect.

Preferably, the inventive wireless communication apparatus may further include a reduced power mode controlling means for moving into a particular operation mode if the short-range wireless communications do not take place at least for a predetermined time period. The power adjusting means, after moving into the particular operation mode, may reduce an adjustable upper limit of the transmission power. This structure curbs the practically variable upper limit of the transmission power even after receipt of the request to boost the transmission power, whereby the same effects as those provided by the foregoing structure are obtained.

According to the invention outlined above, it is possible to delay requesting the wireless communication apparatus to boost the transmission power by reducing the response speed at which to detect the change in the level of the received signal. As a result, when the portable terminal apparatus and wireless communication apparatus wirelessly communicating with each other at close range are moving apart, the increase in the transmission power is suppressed so as to appreciably reduce unevenness of the distance at which to alert the user to the unusual distance traveled between the two apparatuses or beyond which to limit the use of some functions of the portable terminal apparatus.

When the threshold for monitoring the reception level for control over the transmission power is made variable according to the invention, it is possible to control the distance at which the state of connection is difficult to maintain between the communicating apparatuses.

BRIEF DESCRIPTION OF THE DRAWINGS

Further objects and advantages of this invention will become apparent upon a reading of the following description and appended drawings in which:

FIG. 8 is a schematic view graphically showing how the distance between the mobile phone and the wireless communication apparatus is typically related to the occurrence of a link loss at different response speeds for power control;

FIG. 9 is a schematic view graphically showing how the distance between the mobile phone and the wireless communication apparatus, while visually hidden from each other, is typically related to the occurrence of a link loss at different response speeds for power control;

DETAILED DESCRIPTION OF THE PREFERRED EMBODIMENTS

Figure 1A:
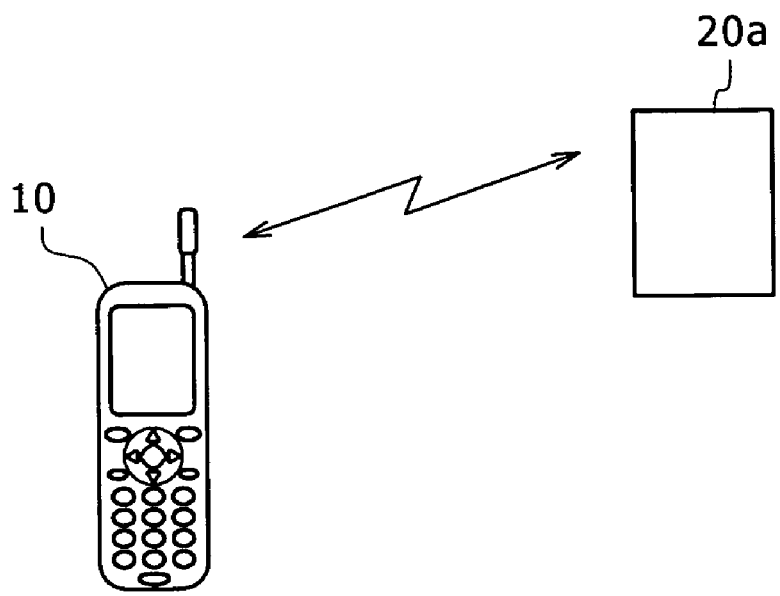
FIGS. 1A and 1B are schematic views showing typical system configurations according to the present invention.
Figure 1B:
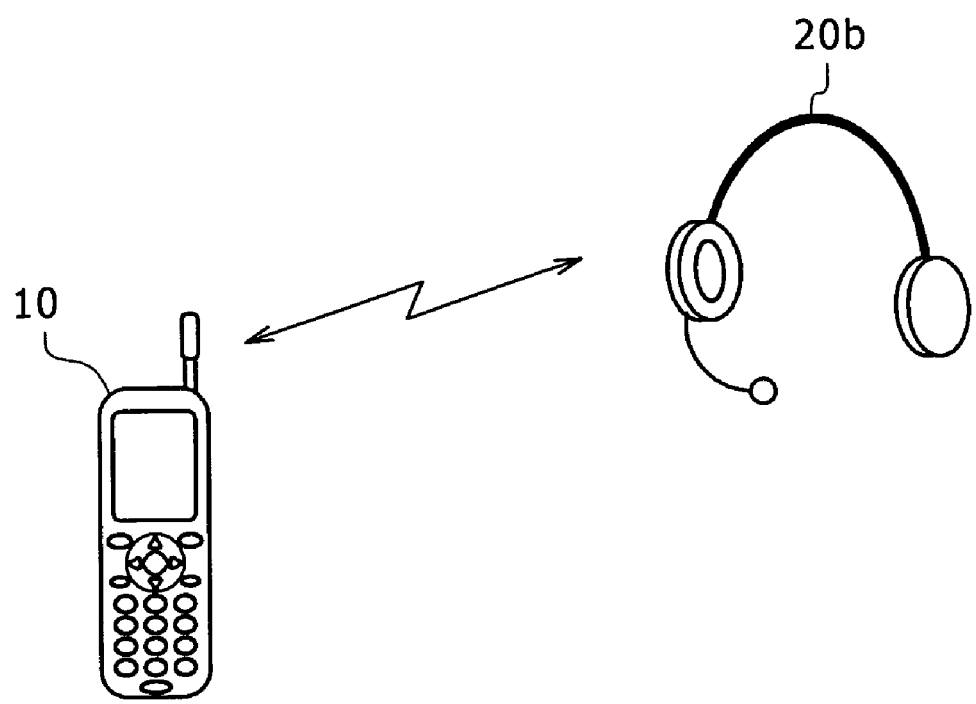

Preferred embodiments of the present invention will now be described in detail with reference to the accompanying drawings. FIGS. 1A and 1B show typical system configurations according to this invention.

The system of FIG. 1A is made up of a mobile phone 10 and a wireless key 20a. The mobile phone 10 is a typical portable terminal apparatus equipped with a short-range wireless communication facility. The wireless key 20a is a typical wireless communication apparatus in short-range wireless communication with the mobile phone 10. The wireless key 20a is a key to cancel the limitation of some functions of the mobile phone 10, and is small enough to be carried around by the user.

The system of FIG. 1B is composed of a similarly structured mobile phone 10 and a headset 20b that is another typical wireless communication apparatus in short-range wireless communication with the mobile phone 10. The headset 20b allows the user to operate the mobile phone 10 to make a call in a wireless hands-free manner. Although a stereo headphone-type headset is shown in FIG. 1B, a single-ear type headset may be used alternatively.

In addition to the devices shown in FIGS. 1A and 1B, the wireless communication apparatus may be implemented in diverse forms including a pendant, a watch, or other suitable objects worn by the user.

The portable terminal apparatus practiced according to this invention is not limited to the mobile phone. The invention may also be applied to PDA's, portable PC's, game machines, and other portable electronic devices.

Figure 2A:
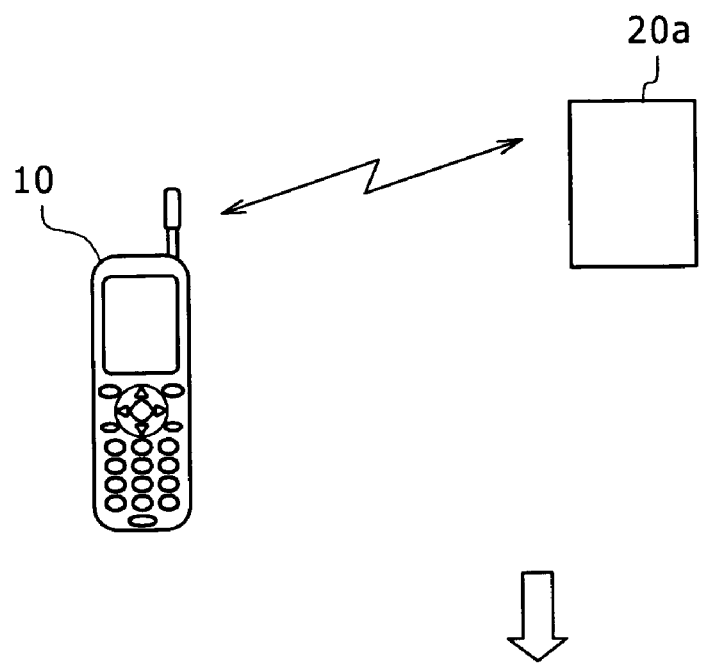
FIGS. 2A and 2B are schematic views showing how the system in FIG. 1A is typically used.
Figure 2B:
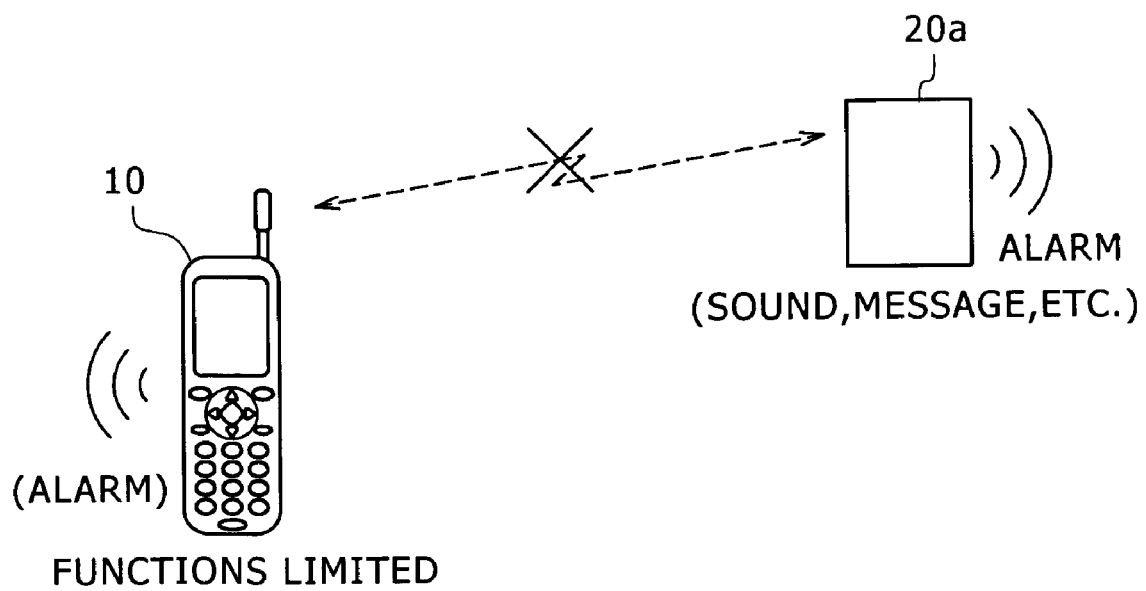

FIGS. 2A and 2B are schematic views showing how the system in FIG. 1A is typically used. In the normal state of use, the user carrying the mobile phone 10 also carries around the wireless key 20a compatible with it. In this state, a wireless signal (radio waves) generated in a substantially continuous manner (including cyclical or intermittent fashion) by the wireless key 20a is being detected by the mobile phone 10 so that the limitation of the latter's functions remains canceled. That is, as long as the mobile phone 10 is receiving the wireless signal from the wireless key 20a, the user can utilize the phone 10 normally. If the mobile phone 10 and wireless key 20b move apart progressively because the mobile phone 10 is being misplaced or stolen, the level detected by the mobile phone 10 in the wireless signal received from the wireless key 20a decreases. When the level of the received signal drops so low that the state of wireless connection is broken down, the wireless key 20a generates an alarm such as a sound (including voice) or message display alerting the user to the disconnection. The mobile phone 10, for its part, starts activating the limitation of its functions in response to the wireless connection breakdown. The limitation of functions may illustratively include disabling of voice and/or data communications, disabling of key operations, and other features designed to prevent a third party's illicit handling of the phone or browsing thereby. The mobile phone 10 may also be arranged to generate an alarm.

The alarm, once generated, may be stopped either automatically upon restoration of the state of connection or manually by the user giving a necessary command. Alternatively, the alarm may be continued for a predetermined time period before it is automatically deactivated. The user may be allowed to make initial settings specifying whether or not to utilize the alarm function.

Figure 3:
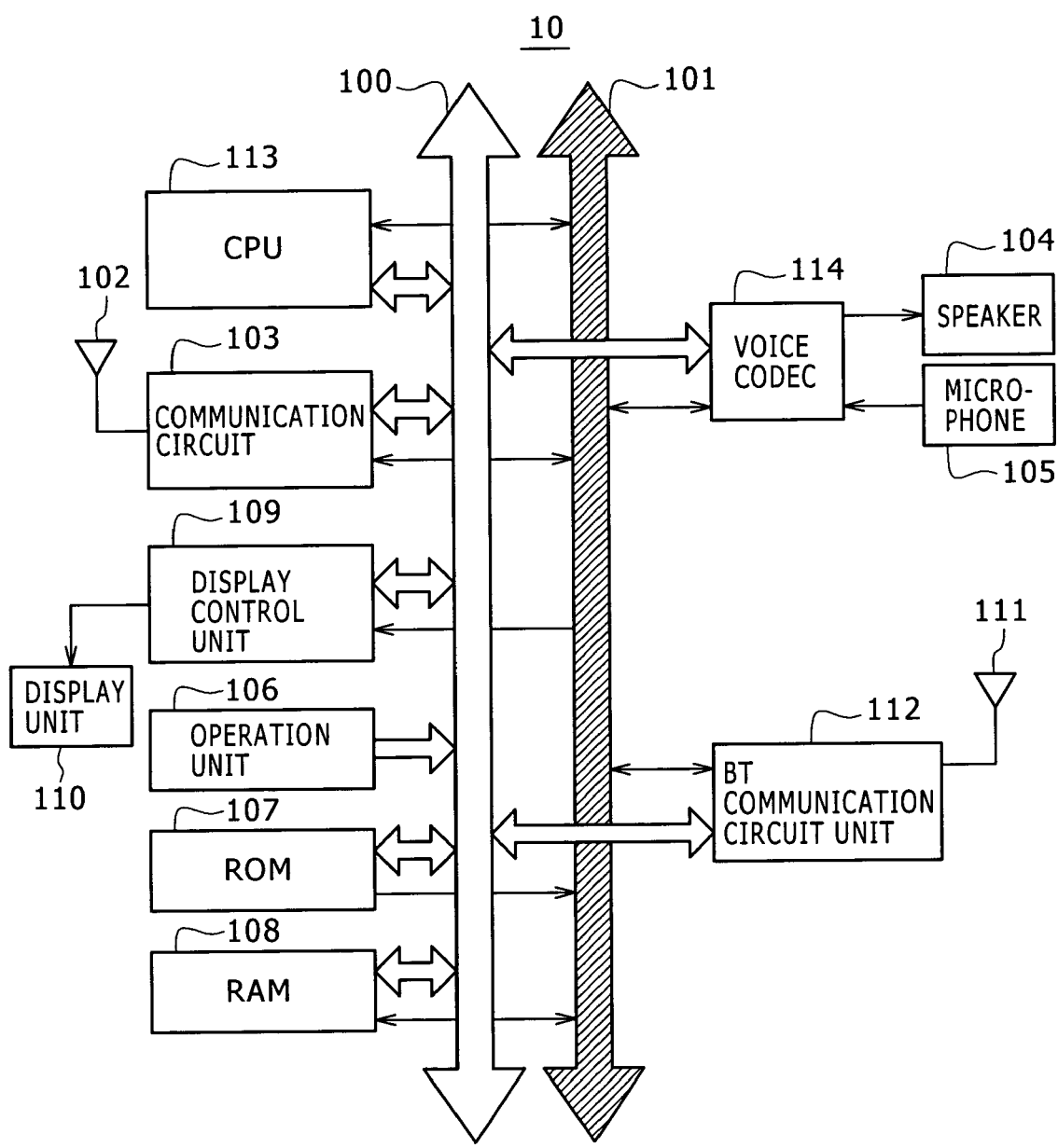
FIG. 3 is a block diagram showing a typical structure of control hardware in a mobile phone.

FIG. 3 is a block diagram showing a typical structure of control hardware in the mobile phone 10. The overall operation of the mobile phone 10 is controlled by a CPU 113. The CPU 113 is connected via a control line 100 to a communication circuit 103, a display control unit 109, an operation unit 106, a ROM 107, a RAM 108, a BT (Bluetooth) communication circuit unit 112, and a voice codec 114. These components connected to the CPU 113 are controlled thereby. The communication circuit 103 performs transmitting and receiving processes of the mobile phone and is connected to a base station through a wireless interface and an antenna 102. The display control unit 109 controls a display unit 110 such as a liquid crystal display unit. The operation unit 106 is furnished with numeric keys and other operation keys that accept commands entered by the user. The ROM 107 stores fixed programs for execution by the CPU 113 as well as fixed data used by the CPU 113 in conjunction with its processing. The RAM 108 is a memory that offers a temporary storage area and a working area in which the CPU 113 handles data. The ROM 107 may include a rewritable memory such as flash memory. The voice codec 114 is connected to a speaker 104 and a microphone 105 and carries out voice signal processing and input/output processing. The BT communication circuit unit 112 serves as the short-rage wireless communication facility of this embodiment and communicates wirelessly with the wireless communication apparatus 20 via a BT antenna 111. A data line 101 is connected to the CPU 113, communication circuit 103, display control unit 109, ROM 107, RAM 108, voice codec 114, and BT communication circuit unit 112. As such, the data line 101 serves as a data transfer path between these components.

Although not shown in FIG. 3, a noncontact IC card facility may also be provided for use as an electronic commuter pass, an electronic purpose or as a credit card. The portable terminal apparatus equipped with such an additional function may be arranged automatically to limit use of that function in case of misplacement or theft. This is another advantage offered by this invention.

Figure 4:
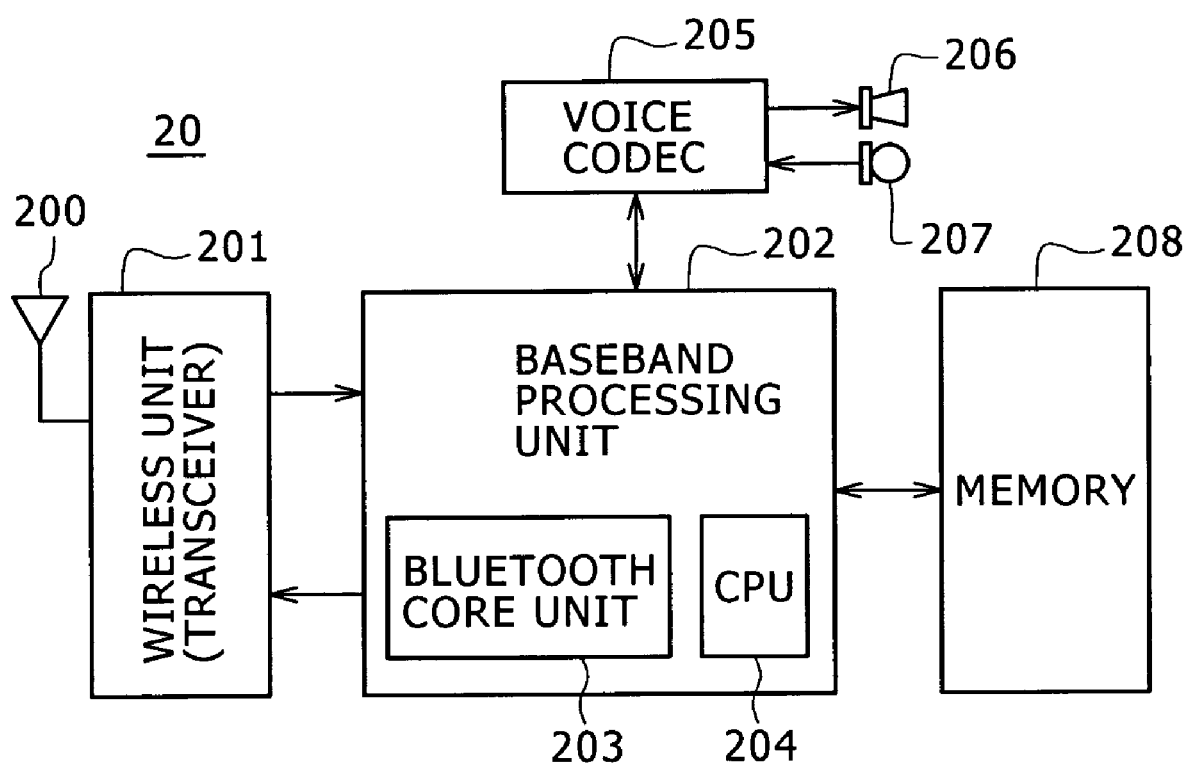
FIG. 4 is a block diagram showing a typical structure of hardware in a wireless communication apparatus for short-range wireless communications.

FIG. 4 is a block diagram outlining a typical structure of hardware in the wireless communication apparatus 20 for short-range wireless communications. A wireless unit (transceiver) 201 receives a wireless signal at a predetermined communication frequency via an antenna 200, decodes the received signal into a baseband signal, and encodes the baseband signal into a wireless signal at a predetermined communication frequency for transmission as a wireless signal. A baseband processing unit 202 has a CPU 204 and a Bluetooth core unit 203, and carries out various forms of digital signal processing on the baseband signal (e.g., detection and correction of data errors, encryption and decryption, interleave and de-interleave operations). A voice codec 205 is connected to the baseband processing unit 202 and performs voice signal processing and input/output processing with regard to a microphone 207 and speaker 206. A memory 208 accommodates programs and data.

Although not shown in FIG. 4, the wireless communication apparatus 20 may include a display device such as an LCD or LED for visual message output. Whereas audio parts (voice codec 205, speaker 206 and microphone 207) are not mandatory in the wireless key 20a, it is nevertheless preferred that the wireless key 20a be furnished with an audio outputting means for alarm generation. The wireless communication apparatus 20 operates on a battery, not shown.

Figure 5:
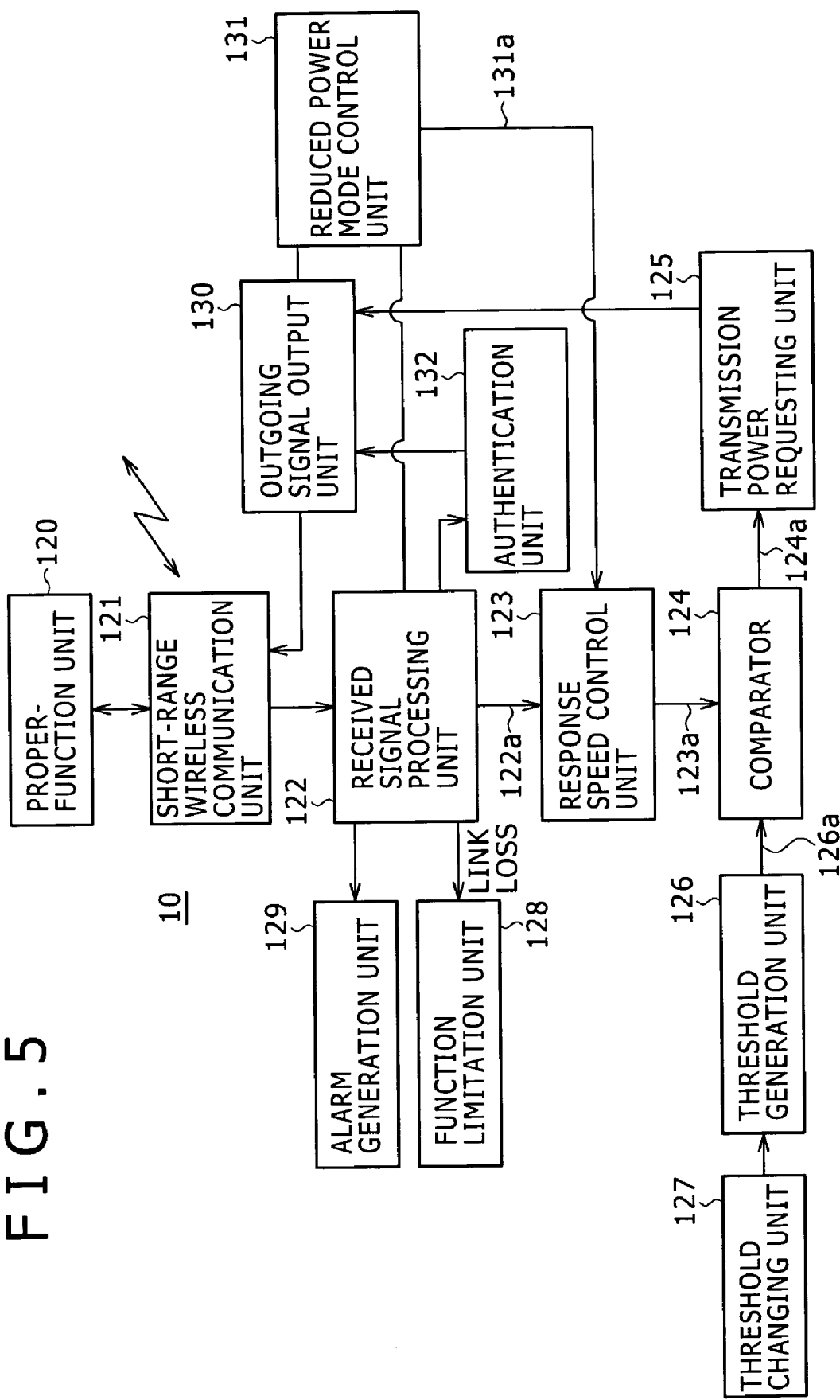
FIG. 5 is a functional block diagram showing major functions of a mobile phone as an embodiment of the present invention.

FIG. 5 is a functional block diagram showing major functions of the mobile phone 10 as an embodiment of the present invention. In addition to its proper-function unit 120, the mobile phone 10 includes a short-range wireless communication unit 121, a received signal processing unit (monitoring means) 122, a response speed control unit 123, a comparator 124, a transmission power requesting unit 125, a threshold generation unit 126, a threshold changing unit (threshold changing means) 127, an alarm generation unit (alarm generating means) 129, a function limitation unit (function limiting means) 128, an outgoing signal output unit (requesting means) 130, a reduced power mode control unit (operation mode controlling means) 131, and an authentication unit 132. These functions are implemented by the CPU 113 in FIG. 3 controlling the connected devices.

The short-range wireless communication unit 121, designed to perform short-range wireless communications, corresponds to the BT communication circuit unit 112 and BT antenna 111 in FIG. 3. The received signal processing unit 122 processes the signal received from the wireless communication apparatus 20, extracting the strength of the received signal and performing other related processes. If a wireless connection breakdown (i.e., link loss) is detected, the received signal processing unit 122 orders the function limitation unit 128 to limit functions of the mobile phone 10 and causes the alarm generation unit 129 to generate a predetermined alarm (sound or display).

With this embodiment, the response speed control unit 123 selectively varies the response speed at which to monitor a received signal 122a from the received signal processing unit 122 in keeping with an output 131a of the reduced power mode control unit 131. More specifically, with the reduced power mode in effect, the response speed control unit 123 reduces the response speed (i.e., prolongs a time constant) at which to monitor the level of the received signal. In this case, the response speed control unit 123 outputs a received signal level 123a after selectively delaying or not delaying the received signal 122a. The response speed control unit 123 may be implemented illustratively by incorporating a low-pass filter or a delay unit. The threshold generation unit 126 outputs a power control level monitoring threshold 126a for comparison with the received signal level 123a. The threshold 126a may be either fixed or varied by the user manipulating the threshold changing unit 127 as in this example. The comparator 124 compares the received signal level 123a with the threshold 126a to see if the signal level 123a has crossed the threshold 126a. If the threshold 126a is found crossed by the signal level 123a, the comparator 124 supplies the transmission power requesting unit 125 with a command 124a to generate a transmission power changing request. With this embodiment, the threshold 126a is made up of an upper and a lower threshold. If the received signal level is found to exceed the upper threshold, the power of transmission is reduced by a predetermined amount; if the received signal level has exceeded the lower threshold, the transmission power is raised by a predetermined amount.

Under instructions from the transmission power requesting unit 125, the outgoing signal output unit 130 generates an outgoing signal for requesting an external wireless communication apparatus 20 to change its transmission power. The outgoing signal output unit 130 also outputs necessary signals for establishing and maintaining the state of connection for short-range wireless communications and supplies information for the authentication of the connection being established, besides carrying out its proper functions (e.g., audio signal output in the case of the headset).

If a state of no data transmission or reception continues for a predetermined time period during short-range wireless communication, the reduced power mode control unit 131 triggers shift to the reduced power mode. As soon as data is transmitted or received, the reduced power mode control unit 131 effects return to the normal operation mode. The authentication unit 132 performs a process of authentication for wireless communications solely between the wireless communication apparatus 20 and a particular mobile phone 10 with this embodiment. The state of connection is authenticated by a known technique offered illustratively by the Bluetooth technology. Where short-range wireless communication is implemented by a setup other than that of Bluetooth, any known method for connection authentication can be utilized.

Figure 6:
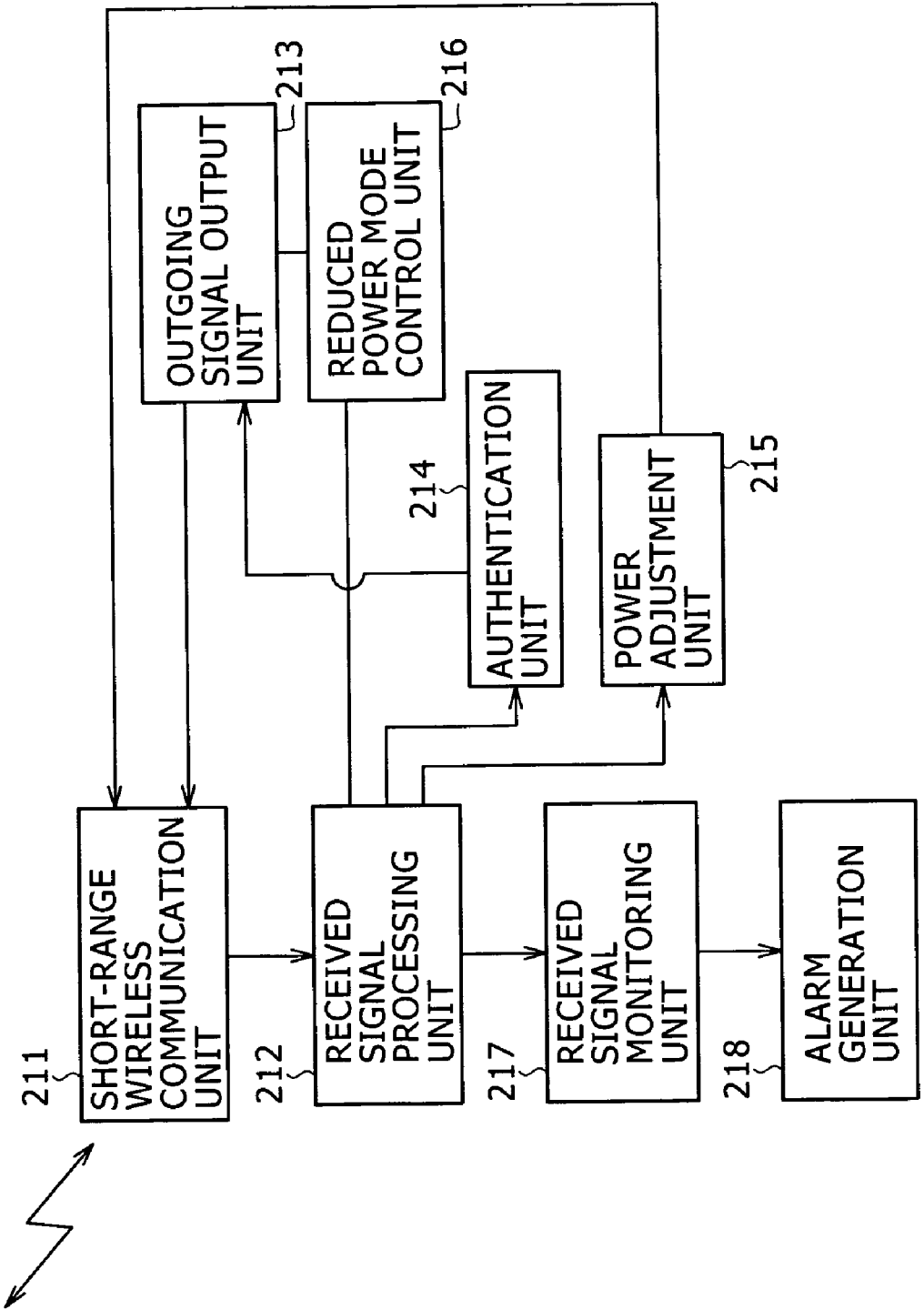
FIG. 6 is a functional block diagram showing major functions of a wireless communication apparatus as another embodiment of the present invention.

FIG. 6 is a functional block diagram showing major functions of the wireless communication apparatus 20 as another embodiment of this invention. The wireless communication apparatus 20 includes a short-range wireless communication unit (connecting means) 211, a received signal processing unit 212, an outgoing signal output unit (transmitting means) 213, an authentication unit 214, a power adjustment unit (power adjusting means) 215, a reduced power mode control unit 216, a received signal monitoring unit 217, and an alarm generation unit (alarm generating means) 218.

The short-range wireless communication unit 211, designed to perform short-range wireless communications, corresponds to the antenna 200, wireless unit 201, and baseband processing unit 202 in FIG. 4. The received signal processing unit 212 processes the signal received from the short-range wireless communication unit 121 of the mobile phone 10, extracting the strength of the received signal and performing other related processes. The outgoing signal output unit 213 outputs information for connection authentication and supplies other outgoing signals as part of its proper functions. The authentication unit 214 performs the process corresponding to that carried out by the authentication unit 132 of the mobile phone 10. The power adjustment unit 215 adjusts the power of transmission based on requests from the mobile phone 10 as well as on the decision reached by the wireless communication apparatus 20 itself. If a state of no data transmission or reception continues for a predetermined time period during short-range wireless communication, the reduced power mode control unit 216 triggers shift to the reduced power mode. As soon as data is transmitted or received, the reduced power mode control unit 216 effects return to the normal operation mode. The received signal monitoring unit 217 monitors the received signal and, if wireless connection is broken down, orders the alarm generation unit 218 to generate an alarm by sound or by display. The wireless communication apparatus 20 operates on a battery, not shown.

Figure 7:
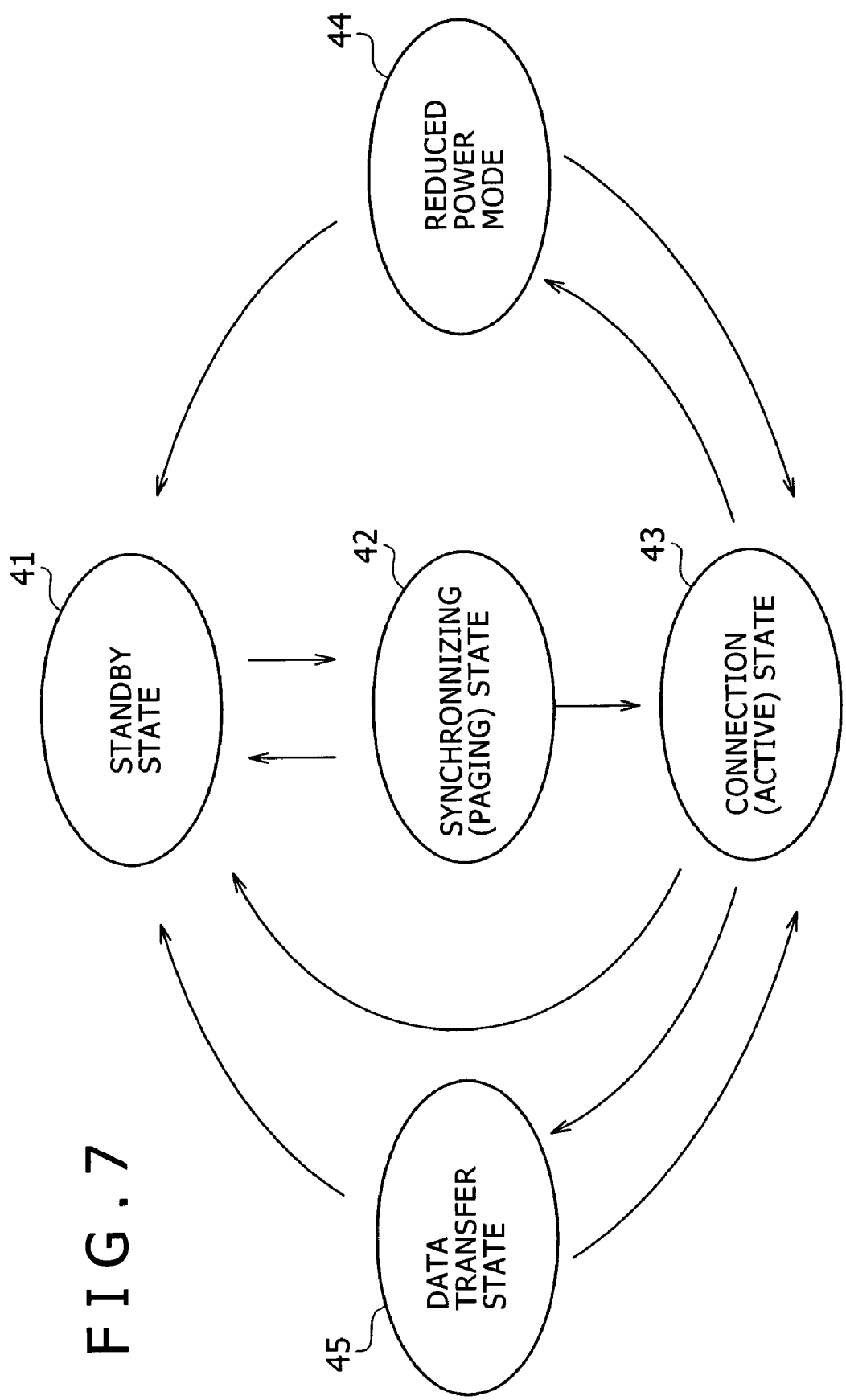
FIG. 7 is a state transition diagram of a short-range wireless communication unit in operation as another embodiment of the present invention.

FIG. 7 is a state transition diagram of the short-range wireless communication unit 211 in operation. Upon power-up, a standby state 41 is first entered. From the standby state 41, a connection (active) state 43 is reached by way of a synchronizing (paging) state 42. If the transfer of data is then needed, a data transfer state 45 is selected. After the data transfer, the connection state 43 is reached again. If no data transfer takes place for a predetermined time period, a reduced power mode 44 is entered. As soon as a request for data transfer is generated, the connection state 43 is reached again. No matter what state is in effect, the standby state 41 is reached in case of a wireless connection breakdown. With this embodiment, the received signal is delayed when the reduced power mode is reached as a particular operation mode. Selection of the reduced power mode is used as a trigger to delay the received signal because there is a high possibility that the mobile phone 10 is in the reduced power mode when it is getting misplaced or stolen.

FIGS. 8 and 9 are schematic views graphically showing how the distance between the mobile phone and the wireless communication apparatus is typically related to the occurrence of a link loss at different response speeds for power control. The vertical axis of each figure stands for measurements RSSI (Received Signal Strength Indicator) of the received signal and the horizontal axis denotes the distance.

FIG. 8 illustrates changes in the level of the signal received illustratively by the portable terminal apparatus from the wireless communication apparatus with respect to the increasing distance between the two apparatuses which are initially positioned close to each other and adjusted in power to an initial reference level. If the response speed for power control is fast, the transmission power of the wireless communication apparatus is raised over the increasing distance. A link loss occurs at a relatively long distance D2. If the response speed for power control is slow, then the distance between the two apparatuses increases while the power level is kept lower than the initial maximum level (i.e., with no increase in power). As a result, a link loss occurs at a distance D1 that is shorter than the distance D2. This is the principle on which the inventive apparatuses act to detect misplacement or theft at an earlier point in time than before.

FIG. 9 shows an environment more adverse than that of FIG. 8 in terms of wireless communication. Illustratively, an initial position 2 in FIG. 9 presupposes that the two apparatuses are not in sight of each other (e.g., the mobile phone is in a bag or in a coat pocket). If the portable terminal apparatus and wireless communication apparatus move apart from their initial positions as in the case of FIG. 8 and if the response speed for power control is fast, the transmission power of the wireless communication apparatus is raised during the movement. In the case of FIG. 9, a link loss occurs at an earlier point in time (i.e., at a shorter distance D4) because the increase in the transmission power is relatively small given that the transmission power at the initial position 2 was fairly high already. However, if the power control response speed is slow in this case, a link loss occurs at a distance D3 still shorter than the distance D4 before the transmission power is raised. The distance D3 is approximately the same as the distance D1 in the case of FIG. 8. In other words, regardless of the state of the initial apparatus positions (i.e., whether or not the two apparatuses are in sight of each other), there is little difference between the distances D1 and D3 at which a link loss occurs. That means the unevenness of the so-called working distance is reduced.

Figure 10:
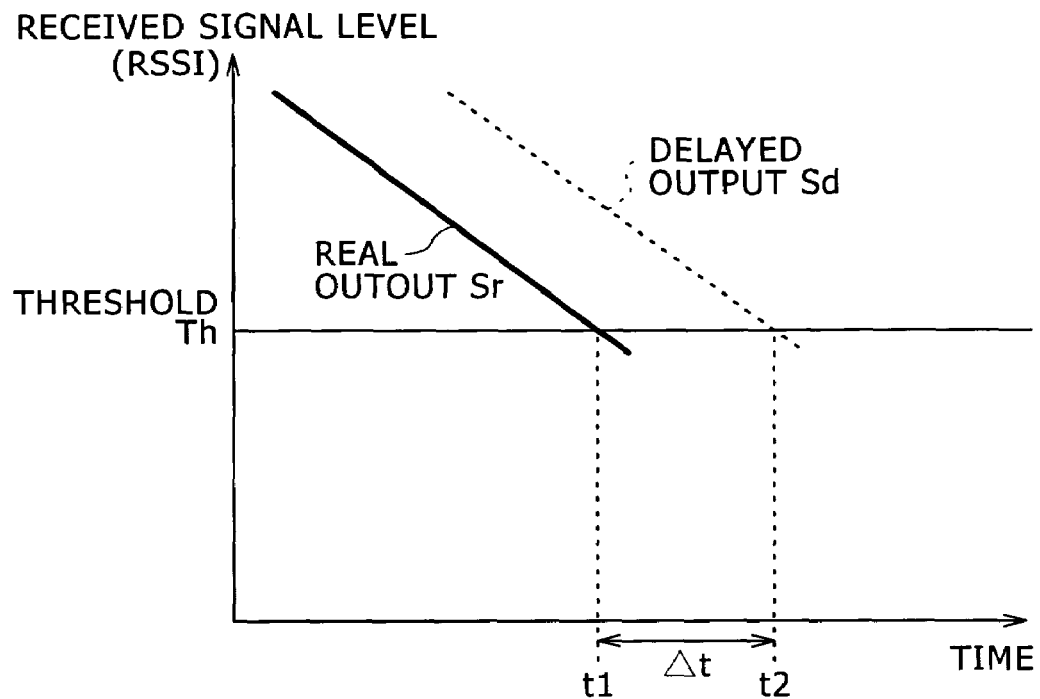
FIG. 10 is an explanatory view illustrating the working principle by which a response speed control unit 123 shown in FIG. 5 delays the response speed for power control.

FIG. 10 illustrates the principle on which the response speed control unit 123 acts to slow the response speed for power control. The graph in FIG. 10 indicates changes in the received signal level in effect when the portable terminal apparatus and wireless communication apparatus move apart at a given speed over time. A threshold Th plotted in FIG. 10 corresponds to the output 126a of the threshold generation unit 126 in FIG. 5. If the received signal level 123a output by the response speed control unit 123 drops below the threshold Th, a request for an increase in the transmission power is generated. A real output Sr indicated by solid line crosses the threshold Th at a time t1, whereas a delayed output Sd indicated by broken line, i.e., an output delayed over time crosses the threshold Th at a time t2 which is later than the time t1. That means the delayed output Sd makes the received signal level appear higher than its real value, the received signal level being used as the basis for determining whether or not to issue a power increase request while the distance is getting longer. A link loss state should preferably be reached during a time difference Δt between the times t1 and t2, i.e., before the function for boosting the transmission power is activated.

Figure 11:
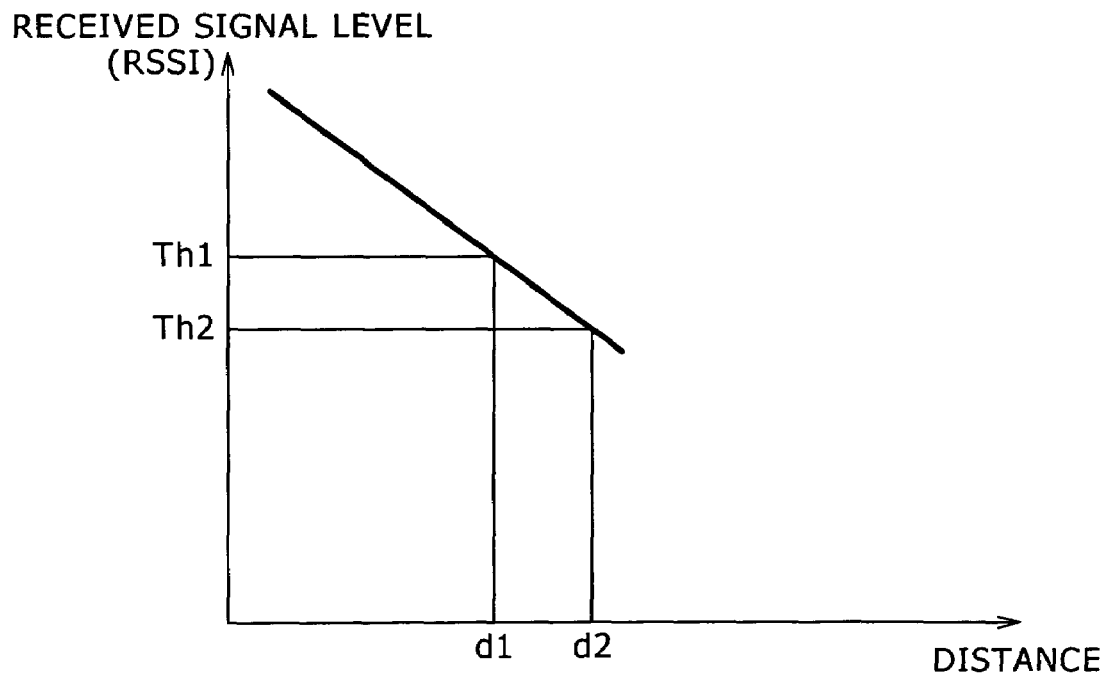
FIG. 11 is an explanatory view showing the distance at which a request to boost power is generated with regard to different thresholds (Th1 and Th2) for monitoring the power control level given a varying waveform of the same received signal level.

As described above, the unevenness of what may be called the link loss occurrence distance (i.e., working distance) is appreciably reduced by slowing the power control response speed in the reduced power communication mode. The link loss occurrence distance may be adjusted by varying some parameters that are explained below. As shown in FIG. 11, if there are different thresholds (Th1 and Th2) for a varying waveform of the same received signal level, power increase requests are generated at different distances (d1 and d2). That means the working distance can be changed provided the transmission power level is suitably adjusted.

More specifically, changes in the upper and lower thresholds for monitoring the power control level provide the following effects: relatively lowering the upper and lower thresholds gives a lower reference level for power adjustment than before, the reference level being closer to the received signal level at which the link loss occurs. That means the link loss occurs at a shorter distance than before. By contrast, relatively raising the upper and lower thresholds provides a higher reference level for power adjustment than before, whereby the link loss occurs at a longer distance than before.

Figure 12:
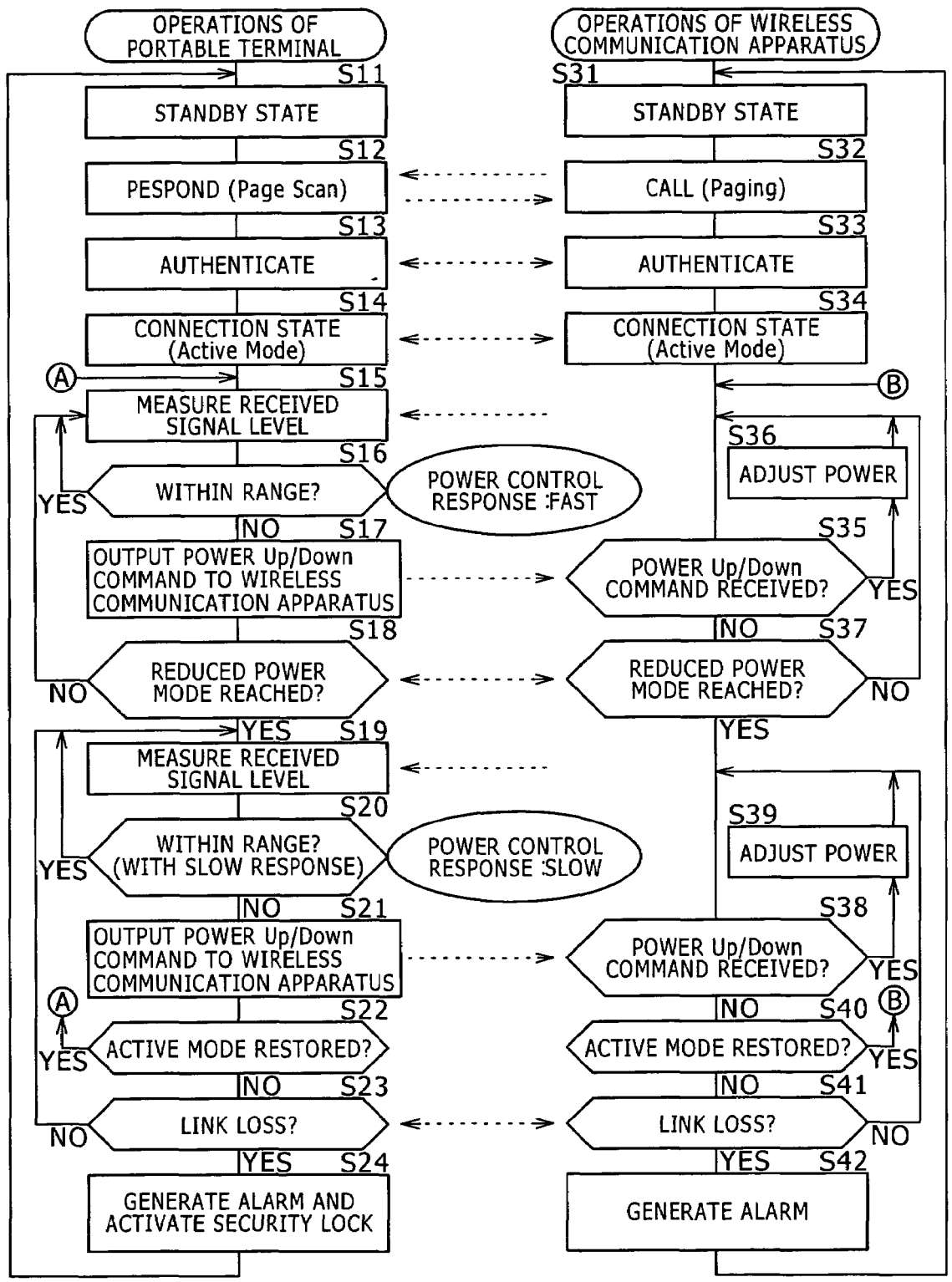
FIG. 12 is a flowchart of steps performed by the portable terminal apparatus and wireless communication apparatus in short-range wireless communication with each other according to the invention.

Described below with reference to the flowchart of FIG. 12 is how the portable terminal apparatus and wireless communication apparatus in short-range wireless communications with each other operate. In this example, the wireless communication apparatus is assumed to be a master and the portable terminal apparatus as a slave. Alternatively, the roles of the two apparatuses may be reversed.

The portable terminal apparatus and wireless communication apparatus are wirelessly connected by the Bluetooth technology when the user gives a suitable command such as pressing of a button on one of the two apparatuses. The portable terminal apparatus and wireless communication apparatus initially enter a standby state in steps S11 and S31. In that state, the wireless communication apparatus makes a call (paging) and the portable terminal apparatus responds to the call (page scan) in steps S32 and S12. The two apparatuses establish synchronization for communication therebetween by exchanging a suitable signal (in packets). After performing connection authentication processes in steps S13 and S33, the two apparatuses enter a connection state (active mode) in step S14 and S34. At this point, a one-on-one communication channel is established between the two apparatuses for data communication. In this example, only the processes associated with the uses relevant to this embodiment of the invention are explained.

With the connection state entered, the wireless communication apparatus periodically sends a predetermined signal to the portable terminal apparatus. The portable terminal apparatus measures the level of the received signal in step S15, and checks to determine whether the received signal level falls within a predetermined range in step S16. At this point, the response speed of the portable terminal apparatus is "fast," which is the normal speed. Depending on the result of the check in step S16, the portable terminal apparatus outputs a power up/down command (i.e., request) in step S17. The wireless communication apparatus receives the command in step S35 and adjusts its power level accordingly in step S36. In this manner, the power level of the signal transmitting party is controlled in accordance with the received signal level between the two apparatuses in communication. This allows the wireless communication apparatus to adjust its power to an optimal transmission level regardless of the distance or obstructions between the portable terminal apparatus and the wireless communication apparatus.

Upon elapse of a predetermined time period with no data transmission effected during short-range wireless communication, the two apparatuses enter the reduced power communication mode in steps S18 and S37. Operating on the Bluetooth technology, this embodiment employs an operation mode called "sniff mode" as the reduced power mode. In this mode, data can be transmitted and received in what is defined as time slots called sniff intervals that take place periodically. The sniff interval, which may be varied as needed, is set illustratively to about one second with this embodiment.

After shift into the reduced power communication mode, the wireless communication apparatus keeps sending the predetermined signal to the portable terminal apparatus through the use of the intermittent time slots. The portable terminal apparatus measures the level of the received signal in step S19 in the same manner as described above, and checks to determine whether the received signal level falls within a predetermined range in step S20. At this point, the response speed control unit 123 shown in FIG. 5 causes the portable terminal apparatus to make the response speed slower than that in step S16 above. Depending on the result of the check in step S20, the portable terminal apparatus outputs a power up/down command to the wireless communication apparatus in step S21. The wireless communication apparatus receives the command in step S38 and adjusts its transmission power accordingly in step S39.

If it becomes necessary to transmit data by short-range wireless communication in steps S22 and S40, the active mode (with the fast response speed) is restored. Following transition from the reduced power communication sate (i.e., power save mode) to the connection state (communication mode), a combination wireless communication apparatus having the above-described headset function raises its response speed for power control in order to stabilize communications during the call.

In case of a link loss that breaks down the connection state in steps S23 and S41, the portable terminal apparatus generates an alarm and limits its functions (i.e., it effects security lock) in step S24. An alarm is also generated by the wireless communication apparatus in step S42. Alternatively, an alarm may be generated by one of the two apparatuses. Furthermore, it is preferred to establish a so-called supervision timeout value, i.e., a predetermined time period at the end of which a link loss is detected. Establishing the supervision timeout value helps prevent or minimize false alarm activation due to an instantaneous drop in the received signal level such as the antenna being covered momentarily by the user's hand.

Once the alarm is generated following the link loss, the transmission power may be maximized to reestablish the connection between the two apparatuses. If the connection is then reestablished, the alarm may be deactivated and the limitation of functions of the portable terminal apparatus may be canceled. The restored connection signifies that the two apparatuses have moved close to each other again and regained their initial status.

Figure 13:
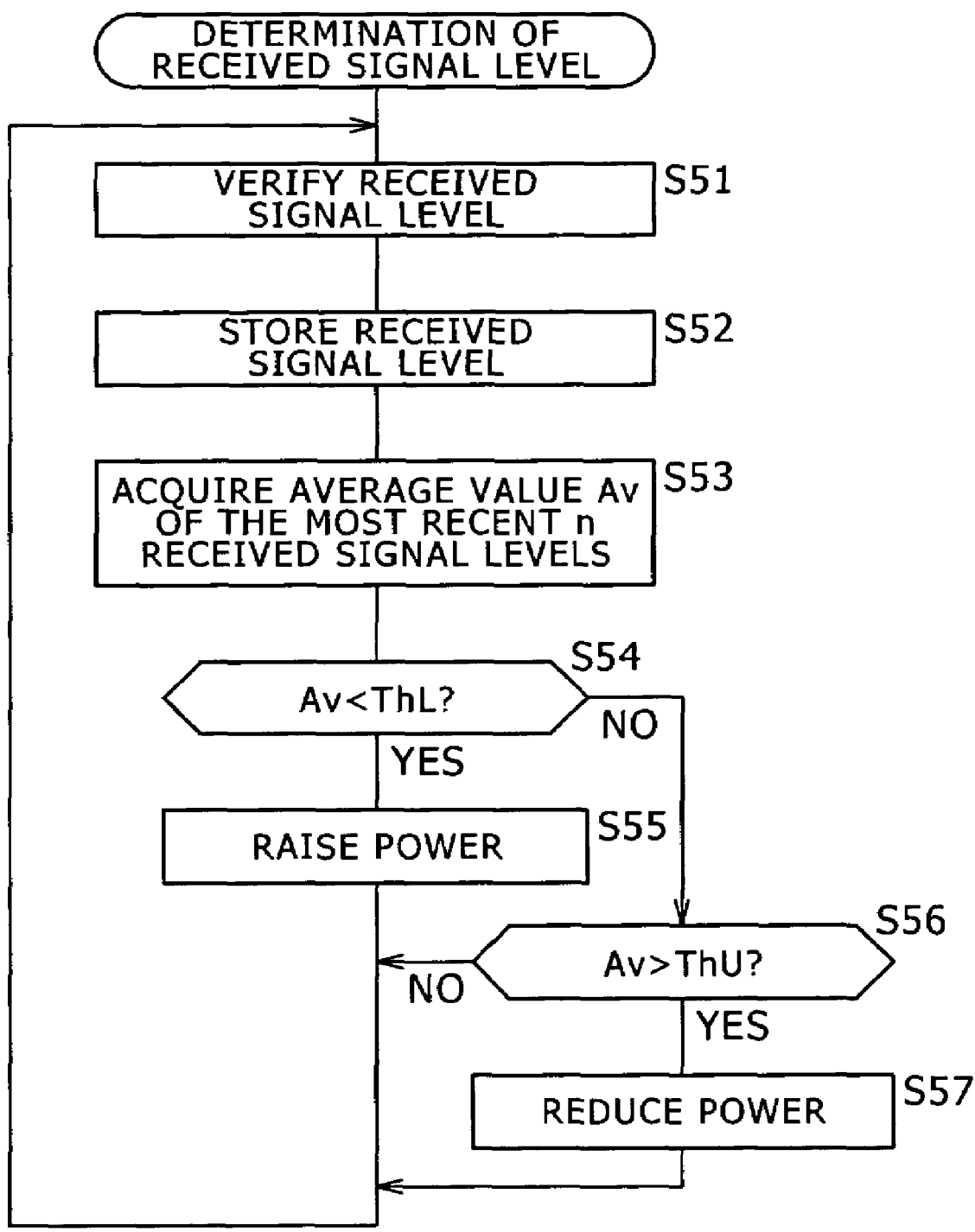
FIG. 13 is a flowchart of steps constituting a typical process of received signal level delay control for reducing the response speed at which to determine the received signal level in step S20 of FIG. 12.

FIG. 13 is a flowchart of steps constituting a typical process of received signal level delay control for reducing the response speed at which to determine the received signal level in step S20 of FIG. 12. The portable terminal apparatus first verifies the received signal level for each time slot in step S51, and stores and accumulates the verified signal levels in step S52. In step S53, the portable terminal apparatus obtains an average value Av of the most recent "n" (plurality) received signal levels. The larger the value "n," the longer the delay. By averaging the plurality of received signal levels, it is possible to reduce the adverse effects of the above-described momentary drop in the reception level. If the acquired average value Av is found to be less than the lower threshold ThL (i.e., "YES" in the check of step S54), then it is determined that the transmission power should be raised (in step S55); if the average value Av is found less than the upper threshold ThU ("YES" in the check of step S56), it is determined that the transmission power should be reduced (in step S57).

Figure 14:
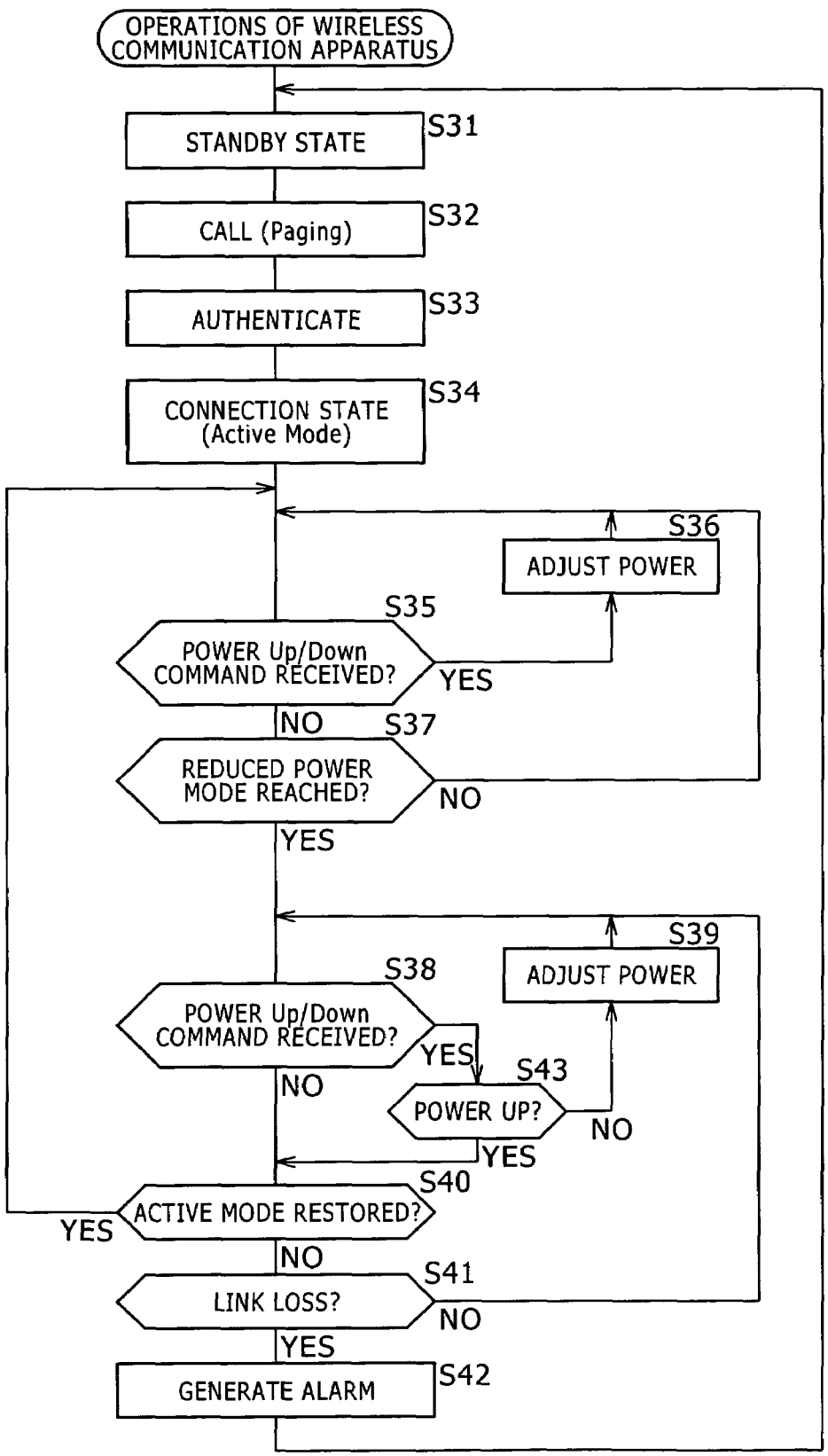
FIG. 14 is a flowchart of steps constituting a first variation of the processing shown in FIG. 12.

Some variations of the processing in FIG. 12 are explained below. FIG. 14 is a flowchart of steps constituting the first variation. These steps are carried out by, the wireless communication apparatus. The steps which have their functionally equivalent counterparts in FIG. 12 are indicated by like reference characters. Whereas the processing in FIG. 12 involves getting the wireless communication apparatus to adjust the transmission power as requested by the portable terminal apparatus, the processing in FIG. 14 causes the wireless communication apparatus to ignore the power-up command that may be received ("YES" in the check of step S43) once the reduced power mode is entered. This allows the portable terminal apparatus to recognize a link loss at a shorter distance without necessarily reducing the response speed. Obviously, the arrangement of having the power-up command ignored may be used in combination with the reduction of the response speed.

Figure 15:
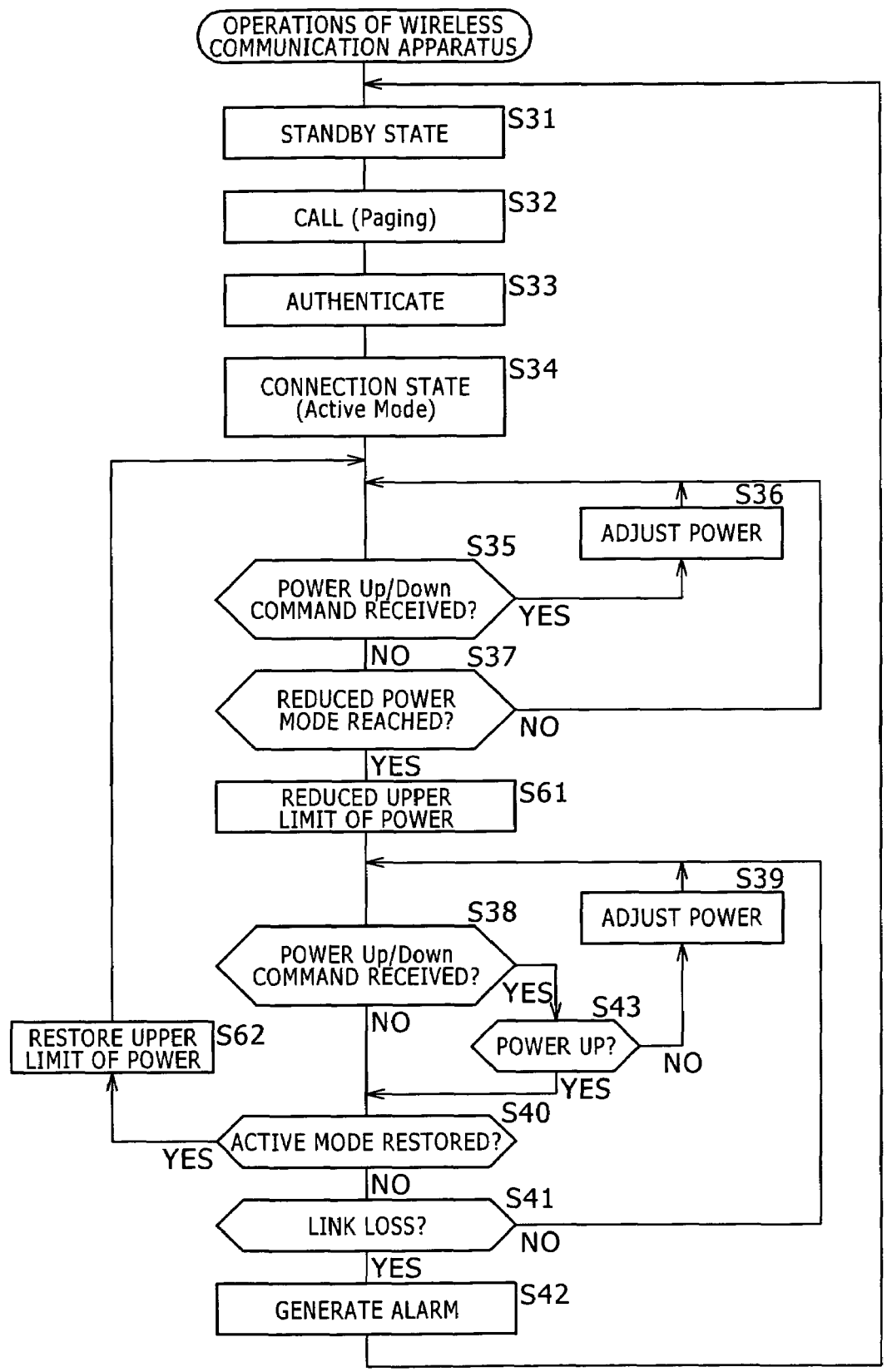
FIG. 15 is a flowchart of steps constituting a second variation of the processing in FIG. 12.

FIG. 15 is a flowchart of steps constituting the second variation of the processing in FIG. 12. These steps are also carried out by the wireless communication apparatus. The steps which have their functionally equivalent counterparts in FIG. 12 are indicated by like reference characters. The processing in FIG. 15 involves getting the wireless communication apparatus temporarily to reduce its adjustable upper limit of power in step S61 after entering the reduced power mode. When the active mode is again selected, the upper power limit is also restored in step S62. With the upper power limit lowered, an increase in the transmission power is suppressed or reduced in step S39 for power control even if the power-up command is received. This enables the portable terminal apparatus to recognize a link loss at a shorter distance without necessarily reducing the response speed. The arrangement of having the upper power limit lowered may also be used in combination with the reduction of the response speed.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow. For example, although the wireless communication apparatus was shown used in combination with one portable terminal apparatus, this is not limitative of the invention. Alternatively, the same wireless communication apparatus may be shared by a plurality of portable terminals owned by the user.

In the description above, the apparatus targeted for protection against misplacement or theft was explained by citing electronic equipment such as the portable terminal apparatus. Alternatively, the short-range wireless communication facility described above as part of the portable terminal apparatus may be made independent. When turned into a stand-alone unit, the short-range wireless communication facility practiced according to this invention may be attached to (housed in or mounted on) the user's personal effects such as brief cases or handbags.

Thus the scope of the invention should be determined by the appended claims and their legal equivalents, rather than by the examples given.

What is claimed is:

1. A short-range wireless communication system comprising a portable terminal apparatus having a short-range wireless communication facility, and a wireless communication apparatus capable of wirelessly communicating with said portable terminal apparatus at close range, one of the two apparatuses monitoring a signal level of a wireless signal transmitted by the other apparatus so that if said signal level drops below a predetermined threshold, said one apparatus requesting said other apparatus to increase transmission power, wherein said portable terminal apparatus limits use of predetermined functions thereof if said signal level of said wireless signal from said wireless communication apparatus at close range drops so low that a state of short-range wireless connection with said wireless communication apparatus cannot be maintained;

said short-range wireless communication facility of said portable terminal apparatus and said wireless communication apparatus move into a particular operation mode if short-range wireless communications do not take place therebetween at least for a predetermined time period; and when said signal level of said wireless signal from said other apparatus is monitored by said one apparatus in said particular operation mode, a response speed at which to detect a level change in said wireless signal is reduced.

2. The short-range wireless communication system according to claim 1, wherein at least one of said portable terminal apparatus and said wireless communication apparatus has an alarm generation unit which, if said signal level drops so low that the connection state cannot be maintained, then alerts a user to the signal level drop.

3. A portable terminal apparatus having predetermined functions, comprising:

a short-range wireless communication unit for wirelessly communicating with a wireless communication apparatus at close range;

a received signal processing unit for monitoring a signal level of a wireless signal generated by said wireless communication apparatus;

an outgoing signal output unit for causing said short-range wireless communication unit to output a request asking said wireless communication apparatus to increase transmission power when said signal level of said wireless signal drops below a predetermined threshold;

a reduced power mode control unit for moving into a particular operation mode when the short-range wireless communications do not take place at least for a predetermined time period;

a function limiting unit for limiting use of said predetermined functions when said signal level of said wireless signal from said wireless communication apparatus drops so low that a state of connection with said wireless communication apparatus cannot be maintained; and a response speed control unit for reducing a response speed at which to detect a level change in said wireless signal output from said wireless communication apparatus when said particular operation mode is in effect, wherein said outgoing signal output unit determines whether or not to make the request for the increase in said transmission power based on the detected output having triggered the reduction of said response speed.

4. The portable terminal apparatus according to claim 3, further comprising an alarm generation unit which, if said signal level drops so low that the connection state cannot be maintained, then alerts a user to the signal level drop.

5. The portable terminal apparatus according to claim 3, wherein, when monitoring said signal level for control over said transmission power, said response speed control unit uses a signal corresponding to a mean value of signal levels detected in a predetermined number of the most recently received wireless signals.

6. The portable terminal apparatus according to claim 3, wherein, when monitoring said signal level for control over said transmission power, said response speed control unit uses the signal level of a signal acquired by delaying said wireless signal.

7. The portable terminal apparatus according to claim 3, further comprising a threshold changing unit for changing said predetermined threshold with which to compare said signal level in order to output said request asking for the increase in said transmission power.

8. A portable terminal apparatus having predetermined functions, comprising:
short-range wireless communicating means for conducting short-range wireless communications with a wireless communication apparatus;
monitoring means for monitoring a signal level of a wireless signal generated by said wireless communication apparatus;
requesting means for causing said short-range wireless communicating means to output a request asking said wireless communication apparatus to increase transmission power when said signal level of said wireless signal drops below a predetermined threshold;
operation mode controlling means for moving into a particular operation mode when said short-range wireless communications do not take place at least for a predetermined time period;
function limiting means for limiting use of said predetermined functions when said signal level of said wireless signal from said wireless communication apparatus drops so low that a state of connection with said wireless communication apparatus cannot be maintained; and
response speed controlling means for reducing a response speed at which to detect a level change in said wireless signal output from said wireless communication apparatus when said particular operation mode is in effect,
wherein said requesting means determines whether or not to make the request for the increase in said transmission power based on the detected output having triggered the reduction of said response speed.

9. A portable terminal apparatus comprising:
communicating means for conducting voice and data communications with a base station;
short-range wireless communicating means for conducting short-range wireless communications with a wireless communication apparatus using a technology called Bluetooth, a registered trademark;
monitoring means for monitoring a signal level of a wireless signal generated by said wireless communication apparatus;
requesting means for causing said short-range wireless communicating means to output a request asking said wireless communication apparatus to increase transmission power when said signal level of said wireless signal drops below a predetermined threshold;
operation mode controlling means for moving into a reduced power mode when said short-range wireless communications do not take place at least for a predetermined time period;
function limiting means for limiting use of at least part of said voice and data communications when said signal level of said wireless signal from said wireless communication apparatus drops so low that a state of connection with said wireless communication apparatus cannot be maintained; and
response speed controlling means for reducing a response speed at which to detect a level change in said wireless signal output from said wireless communication apparatus when said reduced power mode is in effect,
wherein said requesting means determines whether or not to make the request for the increase in said transmission power based on the detected output having triggered the reduction of said response speed.

10. A wireless communication apparatus for conducting short-range wireless communications with short-range wireless communication units located externally, said wireless communication apparatus comprising:
a short-range wireless communication unit for establishing a state of connection for conducting short-range wireless communications with a particular external short-range wireless communication unit;
an outgoing signal output unit for transmitting a wireless signal to said particular external short-range wireless communication unit;
a power adjustment unit for adjusting transmission power for sending said wireless signal to said particular external short-range wireless communication unit in accordance with a request from said particular external short-range wireless communication unit; and
an alarm generation unit which, in case of a disconnection from said particular external short-range wireless communication unit, alerts a user to said disconnection.

11. The wireless communication apparatus according to claim 10, further comprising a reduced power mode control unit for moving into a particular operation mode if said short-range wireless communications do not take place at least for a predetermined time period,
wherein said power adjustment unit, after moving into said particular operation mode, rejects the request to increase said transmission power.

12. The wireless communication apparatus according to claim 10, further comprising a reduced power mode control unit for moving into a particular operation mode if said short-range wireless communications do not take place at least for a predetermined time period,
wherein said power adjustment unit, after moving into said particular operation mode, reduces an adjustable upper limit of said transmission power.

13. A wireless communication apparatus for conducting short-range wireless communications with short-range wireless communication units located externally, said wireless communication apparatus comprising:
connecting means for establishing a state of connection for conducting short-range wireless communications with a particular external short-range wireless communication unit;
transmitting means for transmitting a wireless signal to said particular external short-range wireless communication unit;
power adjusting means for adjusting transmission power for sending said wireless signal to said particular external short-range wireless communication unit in accordance with a request from said particular external short-range wireless communication unit; and
alerting means which, in case of a disconnection from said particular external short-range wireless communication unit, alerts a user to said disconnection.

* * * * *